US005415198A

United States Patent [19]

Ewert et al.

[11] Patent Number: 5,415,198

[45] Date of Patent: May 16, 1995

[54] SAFETY VENT AND DEFLECTOR FOR A PRESSURIZED VESSEL

[75] Inventors: Daniel S. Ewert, Shakopee; Edward B. Congdon, Minneapolis, both of Minn.

[73] Assignee: Deltak Corporation, Minneapolis, Minn.

[21] Appl. No.: 178,706

[22] Filed: Jan. 10, 1994

[51] Int. Cl.[6] ............ F16K 24/00

[52] U.S. Cl. ............ 137/588; 137/587; 137/535

[58] Field of Search ............ 137/588, 535, 587

[56] References Cited

U.S. PATENT DOCUMENTS

| | | | |
|---|---|---|---|
| 1,459,817 | 6/1923 | Bingay . | |
| 2,752,787 | 7/1956 | Jankura | 137/535 |
| 2,787,127 | 4/1957 | Bentz | 62/1 |
| 2,936,781 | 5/1960 | Caen | 137/588 |
| 3,462,994 | 8/1969 | Maust | 73/4 |
| 4,109,819 | 8/1978 | Kushman et al. | 220/208 |
| 4,323,096 | 4/1982 | Dugge et al. | 137/588 |
| 5,158,204 | 10/1992 | Matrich et al. | 220/727 |

FOREIGN PATENT DOCUMENTS

| | | | |
|---|---|---|---|
| 458122 | 7/1913 | France | 137/588 |
| 1259732 | 1/1972 | United Kingdom | 137/588 |

*Primary Examiner*—A. Michael Chambers
*Attorney, Agent, or Firm*—Quarles & Brady

[57] ABSTRACT

A deflector has a ring attached at a first end to a pressurized vessel and around the sealed opening in the vessel. Rods project from a second end of the ring and a cover is mounted on the rods with springs holding the cover over the second end of said ring. Either the ring or the cover has an aperture therethrough an exhaust tube has one end located to receive fluid flowing through the aperture. When a small leak occurs at the sealed opening, escaping fluid flows through the exhaust tube and when the flow of escaping fluid is too great for the exhaust tube to handle, the cover slides away from the tube creating a larger passage through which the fluid can flow.

10 Claims, 2 Drawing Sheets

SAFETY VENT AND DEFLECTOR FOR A PRESSURIZED VESSEL

BACKGROUND OF THE INVENTION

The present invention relates to vessels which contain a pressurized fluid; and particularly to structures which deflect fluid leaking from such vessels when a seal fails.

Vessels, such as tanks and cylinders, are commonly used to store pressurized fluids, either liquids or gases. In many applications, such vessels are relatively large and have access openings through which a person enters the vessel to perform maintenance services. During the use of the vessel, the access opening is sealed to prevent the escape of the pressurized fluid from the vessel. Commonly, a hatch that opens inward is closed over a rim of the access opening with a gasket providing a seal between the hatch and the rim.

Should the seal fail, the pressurized fluid escapes into the environment of the vessel. Because the access openings must be conveniently located for maintenance personnel, it is not always convenient to locate the openings away from areas occupied by other equipment and personnel. Thus during a seal failure, the equipment and personnel adjacent the access opening can be sprayed with the fluid escaping from the vessel, which may harmfully affect the equipment and personnel.

Therefore, it is desirable to provide a mechanism which will direct escaping fluid away from areas occupied by equipment and personnel.

SUMMARY OF THE INVENTION

A general object of the present invention is to provide a structure for deflecting fluids escaping through a seal of a pressurized vessel so that the escaping fluids are directed away from occupied areas near the vessel.

Another object is to provide such a structure which has a first state in which escaping fluid is directed through a first passage, and a second state in which a larger second passage is created when the flow of escaping fluid exceeds an amount that can be released through the first passage.

These objectives are fulfilled by a vent that includes a ring that is attached to the vessel and around a sealed opening in the vessel. A cover is releasably attached over the ring. An exhaust tube has one end attached either to the ring or the cover to receive fluid flowing through an aperture in the ring or cover. A mechanism biases the cover against the ring under normal operating conditions and when small leaks occur in the sealed opening. When a substantial leak occurs, the cover moves away from the ring to create a larger opening, through which the escaping fluid can pass. However, during this latter leak, the cover still deflects the fluid from flowing directly from the vessel.

DETAILED DESCRIPTION OF THE INVENTION

Figure 1:
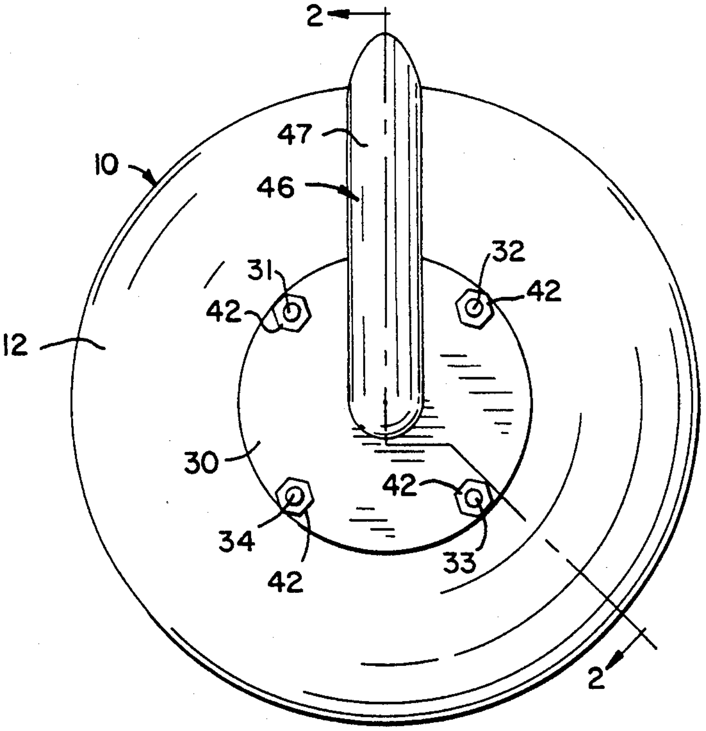
FIG. 1 is a plane view of an end of a tank which is used to store a fluid under pressure.
Figure 2:
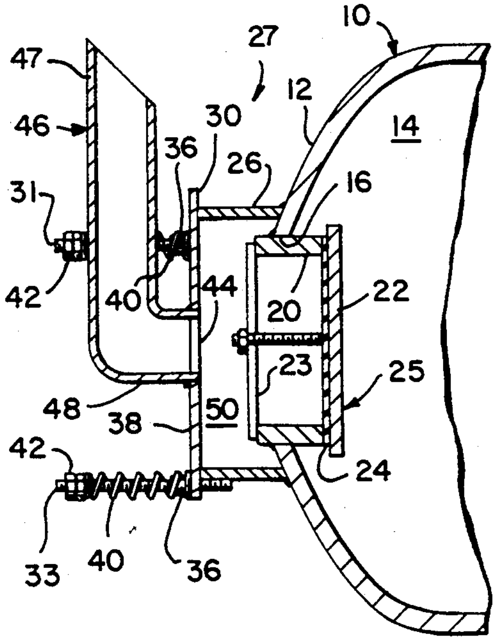
FIG. 2 is a cross section view taken along lines 2—2 of FIG. 1 under normal conditions or when a small leak in a seal at the end of the tank is occurring.

As shown in FIGS. 1 and 2, a cylindrical tank 10 has an end surface 12 and an inner chamber 14 within which is stored a fluid, such as a gas or liquid, under pressure. An aperture 16 extends through the end 12 of the tank and has a metal collar 20 located therein. The outer diametric surface of collar 20 is welded to the end 12 of the tank 10 so as to seal the interface between the tank and the collar. A hatch 22 is removably attached across the end of collar 20 which is within the chamber 14 of the tank 10 and a gasket 24 provides a fluid tight seal between the hatch 22 and collar 20. The hatch 22 is held against the end of collar 20 by any one of a number of conventional fastener 23. In addition during use, the pressurized fluid within chamber 14 also serves to hold the hatch tightly against the end of collar 20. The combination of the collar 20, hatch 22 and gasket 24 provide a conventional access opening 25 through which a maintenance worker can enter chamber 14 by removing hatch 22.

A deflector structure 27 is mounted over the access opening 25. The deflector structure 27 has a circular ring 26 which is attached to the end 12 of the tank 10 in a manner so that the ring surrounds the exterior end of the collar 20. The ring 26 can be attached to the tank 10 by any one of several standard mechanisms, such as by welding. Four threaded rods are each welded at one end to the outer surface of the ring 26 at regular intervals around the circumference of the ring. The rods project beyond the end of the ring 26 that is remote from the tank 10. A cover 30 is placed against the remote end of ring 26 and has four apertures through which the rods 31-34 extend. A short tube 36 is welded to the outer surface 38 of the cover 30 over each of the apertures so that each rod 31-34 also extends through one of the tubes 36. As will be described, rods 31-34 serve as members along which the cover can slide with the tubes 36 acting as guides that prevent the cover from skewing during the sliding movement. A separate compression spring 40 is placed onto each rod 31-34 with one end of the spring abutting the cover 30 and the other end abutting a pair of nuts 42 threaded onto the free end of each rod. Each pair of nuts 42 is tightened against one another to lock the position of the nuts in place along the respective rod. Adjusting the position of the pair of nuts 42 on the rods 31-34 defines the distance of movement of the cover 30 along the rods and the force required to move the cover away from the ring 26

An aperture 44 extends through the center of cover 30. An L-shaped exhaust tube 46 has two legs 47 and 48 with an end of one leg 48 being welded to the cover 30 around and over the center aperture 44. The other, longer leg 47 of the exhaust tube 46 extends vertically upward with .the other open end of the exhaust tube located at approximately the same level as the uppermost portion of tank 10.

With continuing reference to FIG. 2, the cover 30 is held against the end of ring 26 by the springs 40 during normal use of the tank. When access to the tank chamber 14 is required, the nuts 42 and springs 40 are removed from the rods 31-34 and the assembly formed by cover 30 and exhaust tube 46 also is removed from the rods. This allows maintenance personnel to release the access hatch 22 and enter the tank 10 through collar 20. Reversing the process by which of these components were removed allows them to be reinstalled.

In the event of a small failure of the seal between hatch 22 and collar 20, the deflector structure 27 direct escaping fluid through the exhaust tube 46 and away from occupied areas. In this case, the fluid flowing past the gasket 24 enters the cavity 50 between the access hatch 22 and cover 30. The escaping fluid will continue to flow through aperture 44 in hatch 30 and through the exhaust tube 46 exiting from its upper, open end. Because the flow of escaping fluid is relatively low, the force of springs 40 will hold the cover 30 against the outer end of the ring 26. In this situation, the escaping fluid is directed by the deflector structure 27 upward and away from areas adjacent to tank 10 which may be occupied by other equipment or personnel.

Figure 3:
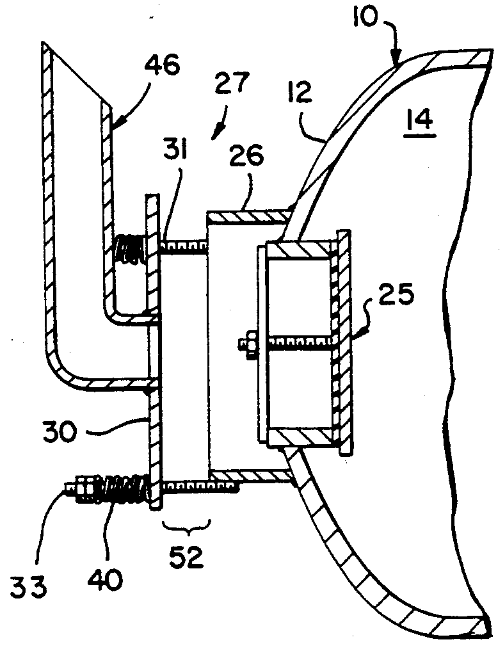
FIG. 3 is a cross section view taken along line 2—2 in FIG. 1 during a major failure of a seal at the end of the vessel.

The deflector structure 27 is also designed to offer protection from direct impingement of escaping fluid in the case of a catastrophic failure of the seal between the access hatch 22 and collar 20. In this situation, the flow of escaping fluid is great enough to build up pressure within cavity 50. When the pressure within cavity 50 exceeds the force exerted by springs 40, the cover 30 slides away from tubular ring 26 as shown in FIG. 3. This sliding action creates a gap 52 between the end of the ring and the cover 30 through which the fluid escapes. The gap 52 forms a significantly larger passage through which the fluid can escape than the passage provided by the aperture 44 and exhaust tube 46. However, during such a catastrophic failure of the tank seal, the hatch 30 becomes a deflector preventing the escaping fluid from shooting directly from the end of the tank 10 into an occupied area.

When the force of the escaping fluid decreases, the springs 40 once again push the cover 30 against the end of the tubular ring 26 so that any remaining escaping fluid is directed through exhaust tube 46.

Thus, the present deflector structure 27 provides a two-stage mechanism for directing escaping fluid away from occupied areas adjacent to the tank 10. Under small leak conditions, the fluid is directed through the exhaust tube 46 upward and away from all areas beside the tank. Under large leak conditions, the deflector structure opens into the state shown in FIG. 3 allowing the greater amount of escaping fluid to be released and yet preventing that large amount of escaping fluid from projecting directly from the end of tank 10. By creating a larger opening through which the fluid can escape during a catastrophic failure of the seal at the end of the tank, a situation in which the cover 30 and tube 46 might be hurled from the end of the tank under the increased pressure of the catastrophic failure is prevented.

Figure 4:
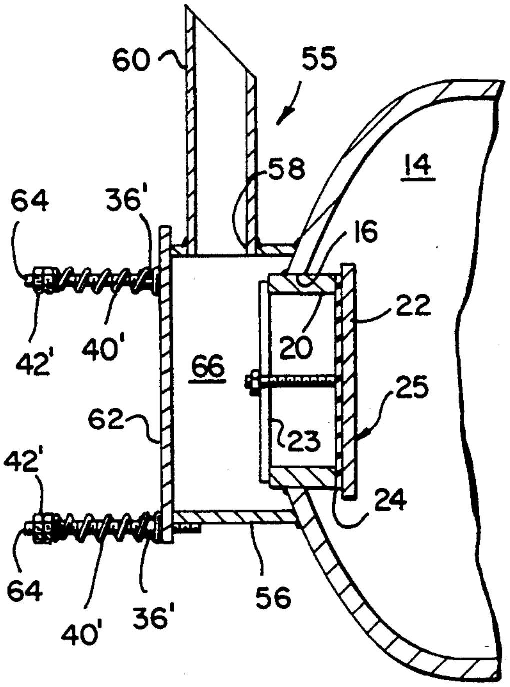
FIGS. 4 and 5 are cross section views similar to those in FIGS. 2 and 3, respectively, but of another embodiment of the present invention.
Figure 5:
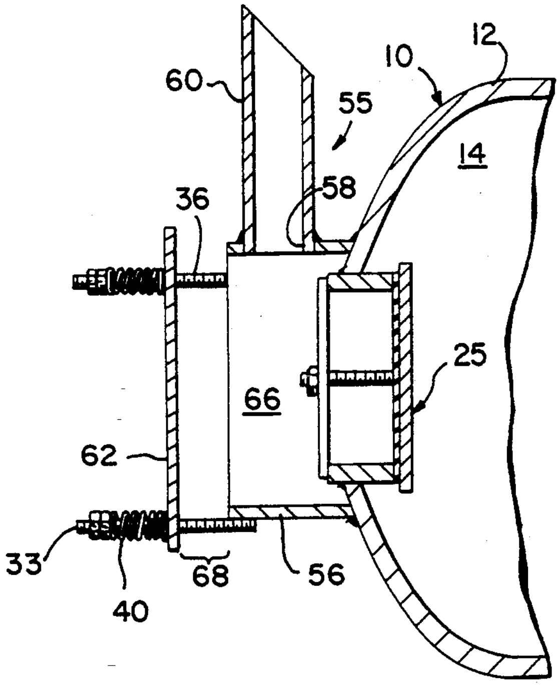

An alternative deflector structure 55 is illustrated in FIGS. 4 and 5. In this embodiment, a different ring 56 is welded to the tank 12 around the access opening 25. Ring 56 has an aperture 58 at the top and one end of a straight exhaust tube 60 is attached to the ring 56 around aperture 58. As with the previous embodiment, four rods 64 are attached equidistantly around the outer surface of the ring 56. A cover 62, similar to cover 30 without aperture 44, is slidably mounted on the rods by tubes 36'. Nuts 42' on the rods 31'-34' attach springs 40 that bias the cover 62 against the ring 56.

When a small leak occurs through the access opening 25, the deflector structure 27 directs the escaping fluid into cavity 66 and upward through exhaust tube 60. The escaping fluid is released to the environment at an open upper end of the exhaust tube. When a significantly larger leak occurs at the access opening 25, pressure builds up in cavity 66. The force due to the increased pressure causes the cover to move along the rods 64. That movement creates a gap 68 between the cover 62 and the ring 56 providing a larger passage through which the fluid can escape.

We claim:

1. A deflector assembly for a vessel that contains a fluid under pressure and that has a sealed opening, said deflector assembly comprising:

- a ring having first and second ends, and attached at the first end to the vessel and around the sealed opening;
- a cover releasably attached over the second end of said ring; and
- an exhaust tube attached at one end to one of said cover and said ring to receive fluid flowing through an aperture in the one of said cover and said ring.

2. The deflector assembly as recited in claim 1 further comprising:

- a plurality of members attached to said ring and projecting from the second end, wherein said cover is slidably attached to said plurality of members; and
- a separate spring connected to each of said plurality of members for biasing said cover against the second end of said ring.

3. The deflector assembly as recited in claim 2 wherein said cover comprises a plate having a plurality of apertures through which said plurality of members extend; and a plurality of guide tubes attached to said plate and through which said plurality of members extend.

4. A deflector assembly for a vessel that contains a fluid under pressure and that has a sealed opening, said deflector assembly comprising:

- an enclosure attached to the vessel around the sealed opening and having a first aperture;
- a cover having a second aperture therethrough;
- an exhaust tube attached at one end to said cover to receive fluid flowing through the second aperture, and having another end open to an ambient environment of the vessel; and
- a mechanism holding said cover against said enclosure over the first aperture, wherein when pressure within said enclosure exceeds a given magnitude said mechanism allows said cover to move away from said enclosure creating a gap therebetween.

5. The deflector assembly as recited in claim 4 wherein said mechanism comprises:

- a plurality of members connected to said ring and extending from the second end and through apertures in said cover; and
- a separate spring attached to each of said plurality of members for biasing said cover against the second end of said ring.

6. The deflector assembly as recited in claim 5 wherein said mechanism further comprises an adjustable connector attaching each spring to one of said plurality of members wherein adjustment of the connector defines a minimum magnitude of pressure required to move said cover away from said enclosure.

7. A deflector assembly for a vessel that contains a fluid under pressure and that has a sealed opening, said deflector assembly comprising:

an enclosure attached to the vessel around the sealed opening and having a first and second apertures;

an exhaust tube attached at one end to said enclosure to receive fluid flowing through the first aperture, and having another end open to an ambient environment of the vessel;

a cover; and a mechanism holding said cover against said enclosure over the second aperture, wherein when pressure within said enclosure exceeds a given magnitude said mechanism allows said cover to move away from said enclosure creating a passage therebetween.

8. The deflector assembly as recited in claim 7 wherein said mechanism comprises:

a plurality of members connected to said ring and extending therefrom through apertures in said cover; and a separate spring coupled to each of said plurality of members to bias said cover against the second end of said ring.

9. The deflector assembly as recited in claim 8 wherein said mechanism further comprises an adjustable connector coupling each spring to one of said plurality of members wherein adjustment of the connector defines a minimum magnitude of pressure required to move said cover away from said enclosure.

10. The deflector assembly as recited in claim 8 wherein said mechanism comprises:

a plurality of members connected to said ring and extending therefrom through apertures in said cover; and a plurality of compression springs with each one having an end that engages one of said plurality of members and another end that engages said cover.

* * * * *